Patented Aug. 14, 1945

2,382,326

UNITED STATES PATENT OFFICE 2,382,326

PLANT GROWTH STIMULANT

Sebastian B. Mecca, Philadelphia, Pa., assignor to Schuylkill Chemical Company, Philadelphia, Pa., a corporation of Delaware No Drawing. Application January 16, 1941,
Serial No. 374,771

7 Claims. (Cl. 71—2)

This invention relates to new and useful improvements in compositions for promoting the growth of seeds, plants, bulbs and the like.

The principal object of the present invention is to provide a composition characterized by its cell-proliferant properties as well as its ability to produce strong, healthy plants which are resistant to disease.

Another object of the invention is to provide a composition of the type described which functions to initiate root growth and generally to aid in plant propagation.

In addition to the foregoing, the invention has for a further object the provision in a composition as aforesaid of certain nutrient and micrometabolic elements sufficient to insure strong and physiologically healthy plants.

These and other objects of the invention and the various features and details thereof are hereinafter fully set forth and described.

The invention consists essentially in the discovery that a composition containing one or more cell-proliferant substances together with one or more plant hormone or root initiator substances may be employed to treat seeds, bulbs, plants and the like to insure the production of strong, healthy plants which are physiologically sound and exhibit a marked resistance to plant diseases.

As the cell proliferant, I employ substances such as allantoin, urea, thiourea and the like which have good cell producing properties and function not only to proliferate and produce strong plant root formation but also produce healthy plants which are resistant to disease. Too, these substances are neither injurious nor poisonous and can be used without danger of toxicity. Preferably, however, I prefer the use of allantoin because of its greater effectiveness and the more rapid rate of cell production obtained therefrom.

The root initiator employed may consist of any one or more plant hormones suitable for good plant propagation and for this purpose it has been found that the acetic acid or the acetamide derivatives of naphthalene, indole, phenyl and the like give satisfactory results. Other substances such as furfuryl acetate, tetra-furfuryl alcohol, calcium fuorate, caffein, uracil, nicotine and the like also can be employed.

In the treatment of plants, bulbs, seeds and the like, the composition of the invention may be mixed with a suitable dry pulverized inert vehicle and used in powdered form for dusting cuttings, seeds, bulbs, tubers and the like, or a concentrated form of the composition may be produced for mixture with water to form a solution in which such growths may be soaked. Too, the water solution may be used as a spray for fruit and like crops.

The proportion of the various substances in the composition vary depending upon its intended use in dry powdered or solution form, and also the percentages of these substances in the composition likewise may vary in each of these particular forms in which it is used.

Thus, where the composition is to be mixed with an inert dry pulverized vehicle for use in powdered form the percentage of the cell proliferant may vary from approximately 20.0% to 95.0%, while the percentage of the hormones or root initiator may vary from approximately 5.0% to 80.0%.

On the other hand, in the concentrate phase of the composition for use in water solution form the percentage of the cell proliferant in the concentrate may vary from approximately 90% to 99.0%, while the hormones or root initiator may vary from approximately 1.0% to 10.0%.

The following examples are illustrative of a composition embodying the present invention prepared for mixture with an inert vehicle for use in dry powdered form:

Example I

| | Per cent |
|---|---|
| Proliferant (allantoin) | 92.0 |
| Hormones (naphthalene acetamide) | 8.0 |

A satisfactory dusting powder for the treatment of plants and the like is produced by thoroughly mixing the foregoing composition with dry pulverized talcum, bentonite, kieselguhr, kaolin or the like in the approximate ratio of 1 gram of said composition in 7 kilograms of said inert vehicle.

Example II

| | Per cent |
|---|---|
| Proliferant (allantoin) | 20.0 |
| Hormones (naphthalene acetamide) | 80.0 |

A satisfactory dusting powder for the treatment of plants and the like is produced by thoroughly mixing the foregoing composition with dry pulverized talcum, bentonite, kieselguhr, kaolin or the like in the approximate ratio of 1 gram of said composition in 8 kilograms of said inert vehicle.

Example III

| | Per cent |
|---|---|
| Proliferant (allantoin) | 81.0 |
| Hormones (naphthalene acetamide) | 19.0 |

A satisfactory dusting powder for the treatment of plants and the like is produced by thoroughly mixing the foregoing composition with dry pulverized talcum, bentonite, kieselguhr, kaolin or the like in the approximate ratio of 1 gram of said composition in 4 to 5 kilograms of said inert vehicle.

On the other hand, the following examples are illustrative of cell-proliferant-hormone composition suitable for mixture with water for use in liquid form:

Example I

| | Percent |
|---|---|
| Proliferant (allantoin) | 99.0 |
| Hormones (naphthalene acetamide) | 1.0 |

Example II

| | Percent |
|---|---|
| Proliferant (allantoin) | 90.0 |
| Hormones (naphthalene acetamide) | 10.0 |

To produce a liquid solution of either of the above compositions suitable for the proper treatment of plants and the like, approximately 1 gram of said compositions is dissolved in from 2 to 8 kilograms of water depending upon the strength of the solution desired as dictated by the kind and strength of the plant or plants to be treated therewith.

Now as previously stated, it is desirable in many instances to embody in the foregoing composition with the proliferant and hormone substances, certain nutrient and micrometabolic substances. The nutrients added to the composition may be one or more suitable inorganic salts such as, for example, potassium acid phosphate, calcium nitrate, magnesium sulfate, ammonium sulfate and the like, while the micrometabolic elements for stimulating physiological processes in the plants likewise may be one or more suitable inorganic salts of the type such as, for example, manganese sulphate, iron potassium citrate, boric acid, zinc sulphate, copper sulphate and the like. These nutrients and micrometabolic substances lead to the growth of superior and strong, healthy plants.

While the addition of these nutrient and micrometabolic substances operates to decrease the percentage of the cell proliferant and hormones with respect to the composition, the addition of these substances does not alter the proportion or ratio of the proliferant and hormones to the vehicle whether the latter be in the powdered or liquid form previously described.

Bearing this in mind, examples of the compositions of the invention containing these nutrient and micrometabolic substances follow.

(A) Compositions containing nutrients or micrometabolic elements for use with inert vehicle in dry powdered form:

Example I

| | Percent |
|---|---|
| Proliferant (allantoin) | 6.0 |
| Hormones (naphthalene acetamide) | 0.5 |
| Nutrients: | |
|     Potassium acid phosphate | 15.5 |
|     Calcium nitrate | 47.6 |
|     Magnesium sulphate | 25.5 |
|     Ammonium sulphate | 4.2 |
| Micrometabolic elements: | |
|     Manganese sulphate | 0.05 |
|     Zinc sulphate | 0.05 |
|     Boric acid | 0.05 |
|     Copper sulphate | 0.05 |
|     Iron potassium citrate | 0.50 |

A satisfactory dusting powder for the treatment of plants consists of 1 gram of the above composition thoroughly mixed with approximately 0.5 kilograms of dry pulverized talcum, bentonite, kieselguhr, kaolin or other related inert substance.

Example II

| | Percent |
|---|---|
| Proliferant (allantoin) | 79.80 |
| Hormones (naphthalene acetamide) | 19.32 |
| Micrometabolic elements: | |
|     Manganese sulphate | 0.39 |
|     Zinc sulphate | 0.39 |
|     Boric acid | 0.39 |
|     Copper sulphate | 0.01 |

A satisfactory dusting powder for the treatment of plants consists of 1 gram of this composition thoroughly mixed with approximately 0.9 kilograms of dry pulverized talcum, bentonite, kieselguhr, kaolin or other related inert substance.

(B) Compositions in concentrate form for use in water solution and containing nutrients and/or micrometabolic elements:

Example I

| | Percent |
|---|---|
| Proliferant (allantoin) | 96.39 |
| Hormone (naphthalene acetamide) | 1.00 |
| Nutrients: | |
|     Potassium acid phosphate | .30 |
|     Calcium nitrate | 1.00 |
|     Magnesium sulphate | .50 |
|     Ammonium sulphate | .10 |
| Micrometabolic elements: | |
|     Manganese sulphate | .20 |
|     Zinc sulphate | .20 |
|     Boric acid | .20 |
|     Iron and potassium citrate | .10 |
|     Copper sulphate | .01 |

Example II

| | Percent |
|---|---|
| Proliferant (allantoin) | 97.29 |
| Hormone (naphthalene acetamide) | 2.00 |
| Micrometabolic elements: | |
|     Manganese sulphate | .20 |
|     Zinc sulphate | .20 |
|     Boric acid | .20 |
|     Iron and potassium citrate | .10 |
|     Copper sulphate | .01 |

Example III

| | Percent |
|---|---|
| Proliferant (allantoin) | 92.90 |
| Hormone (naphthalene acetamide) | 5.00 |
| Nutrients: | |
|     Potassium acid phosphate | .30 |
|     Calcium nitrate | 1.00 |
|     Magnesium sulphate | .50 |
|     Ammonium sulphate | .10 |
| Micrometabolic elements: | |
|     Manganese sulphate | .20 |
|     Copper sulphate | .01 |

Satisfactory liquid solutions for the treatment of plants and the like consist of approximately 1 gram of any one of the three compositions above dissolved in from 2 to 8 kilograms of water depending upon the strength of solution desired as dictated by the kind and strength of the plant or plants to be treated therewith.

In preparing the aforesaid compositions it is essential that complete dispersion of the various substances is effected in order that the product may be of uniform strength throughout. I have found that excellent results are obtained by following the procedures now to be described.

For example, in producing the product of the invention in dry powdered form I prefer to first make a concentrated solution of the ingredients of the composition after which the resulting solution is mixed with the selected dry pulverized inert vehicle by well known trituration methods until a semi-paste is produced. This semi-paste is then spread out on trays of porcelain or the like and dried in a suitable drier at comparatively low temperatures of the order of 120° F. The dried product is then screened through screens of approximately 40 to 100 mesh. This screened product is now ready for use and may be packaged or bottled for shipment and sale.

On the other hand, the procedure employed to produce the concentrate form of the composition to be dissolved in water for use in liquid form is essentially the same as the above except that instead of mixing the solution of the composition ingredients with an inert vehicle as above, the solution is converted into a moist powder by trituration and then dried and screened as in the case above. The resulting product is then packaged or bottled for shipment and sale together with instructions to the purchaser in respect of its mixture with water for use.

As illustrative of the effectiveness of the present invention in the powdered form described in the treatment of plant growths, it has been found that when cuttings such as rooting boxwood, various evergreens, chrysanthemums, and peach, apple, pear and other fruit cuttings as well as flowering shrubs, are dipped in the powder and then planted, the resulting root systems of such plants are not only considerably larger and denser but in no cases were any of the plantings lost when subsequently dug up and transplanted into pots, boxes or the like.

Too, the use of the present invention has been found to decrease greatly the mortality rate resulting from diseased plants, bulbs and the like, and in illustration of this advantage afforded by the invention, the following cases are given. For instance, in one case a large number of sweet potatoes (most of them badly diseased) were soaked for a period of fifteen hours in a water solution of the concentrate form of the invention and then planted. As the result of this treatment the ensuing potato crop or yield was 35% greater than it would otherwise have been and, in addition, the resulting potatoes were of better quality and no disease at all was apparent in the yield.

Similarly, in another case, two hundred calla lilly bulbs (most of them diseased) were subjected to the same soaking as the sweet potatoes above and, as a result of such treatment, every single bulb grew into a healthy, strong plant free from disease, producing blooms that were large and of excellent quality.

Numerous additional illustrations of the advantages and benefits obtained from the use of the present invention could, of course, be set forth but the foregoing illustrative examples are deemed sufficient for the present purpose, and while certain embodiments of the said invention have been herein set forth and described, it is not intended to limit the invention to such disclosure but that changes and variations may be made and incorporated therein within the scope of the annexed claims.

I claim:

1. A stable plant growth stimulant composition in dry powdered form capable of inducing rooting and of stimulating healthy vigorous plant growth comprising substantially pure allantoin non-injurious to plant structures and acting as a cell proliferant, and a plant hormone.

2. A stable plant growth stimulant composition in dry powdered form capable of inducing rooting and of stimulating healthy vigorous plant growth comprising substantially pure allantoin non-injurious to plant structures and acting as a cell proliferant, a plant hormone, and plant nutrient materials.

3. A stable plant growth stimulant composition in dry powdered form capable of inducing rooting and of stimulating healthy vigorous plant growth comprising substantially pure allantoin non-injurious to plant structures and acting as a cell proliferant, a plant hormone, and plant micrometabolic elements.

4. A stable plant growth stimulant composition in dry powdered form capable of inducing rooting and of stimulating healthy vigorous plant growth comprising substantially pure allantoin non-injurious to plant structures and acting as a cell proliferant, a plant hormone, plant nutrient materials, and plant micrometablic elements.

5. A stable plant growth stimulant composition in dry powdered form capable of inducing rooting and of stimulating healthy vigorous plant growth comprising substantially pure allantoin non-injurious to plant structures and acting as a cell proliferant, and naphthalene acetamide.

6. A stable plant growth stimulant composition in dry powdered form capable of inducing rooting and of stimulating healthy vigorous plant growth comprising substantially pure allantoin non-injurious to plant structures and acting as a cell proliferant, a plant hormone, and a dry pulverized inert vehicle.

7. A stable plant growth stimulant composition in dry powdered form capable of inducing rooting and of stimulating healthy vigorous plant growth comprising substantially pure allantoin non-injurious to plant structures and acting as a cell proliferant, plant nutrient materials, plant micrometabolic elements, and a dry pulverized inert vehicle.

SEBASTIAN B. MECCA.